Patented Apr. 10, 1934

1,954,506

UNITED STATES PATENT OFFICE 1,954,506

MANUFACTURE OF ALCOHOLS

Adrianus Johannes van Peski, Bussum, and Wilhelm Carel Brezesinska Smithuysen, Amsterdam, Netherlands, assignors to Shell Development Company, San Francisco, Calif., a corporation of Delaware No Drawing. Application December 9, 1932, Serial No. 646,518. In the Netherlands July 8, 1932

14 Claims. (Cl. 260—156)

It is known to treat alkyl sulfuric acid or sulfuric acid which has been employed to absorb olefines, before or after dilution, possibly after it has been subjected to a hydrolytic treatment, with a high-boiling organic liquid such as a high-boiling hydrocarbon mixture of the character of paraffinous oil, in order to extract polymerides.

The unpleasant smell peculiar to synthetic alcohols obtained via the absorption of olefines in an acid such as a mineral acid as sulfuric acid is ascribed to the presence of polymerides. In order to avoid complications, the polymerides should preferably be removed from the hydrolytic mixture before distilling off the alcohol. An objection to this process is that it is difficult to regenerate the high-boiling organic liquid due to the high-boiling temperatures of part of the polymerides. The process, according to the invention, whereby use is made of lower-boiling extraction agents, has not this objection.

It has been found that lower-boiling extraction agents can be very suitably used and that these agents can also be employed as entraining liquids in the azeotropic distillation of the diluted alcohol which has been obtained by the distillation of the hydrolytic mixture subsequent to the removal of polymerides.

The use of the same substance as entraining liquid and as extraction agent has great advantages. It has been found that when different liquids are used as extraction agent and as entraining liquid, difficulties may arise, which, in view of the extremely complicated behaviour of mixtures of various components, cannot, practically speaking, be foretold. For instance, it may even prove to be impossible to separate, according to the azeotropic process, the water from the diluted alcohol which has been obtained by distillation of the hydrolytic mixture.

The extraction agents—entraining liquids used, according to the invention, should not be soluble, or only to a slight extent, in the liquid to be extracted, should be as soluble as possible with the polymerides and have no or only a poor solubility for water.

Extraction agents suitable for the process are, for instance: benzol, toluol, xylol, carbon tetrachloride, ethylene chloride, trichlor ethylene, certain benzine fractions, cyclohexane, isopropyl acetate and such like substances.

As to which of the extraction agents, satisfying the above-mentioned requirements, will be used in a given case depends on the nature of the olefine or of the olefinic mixture.

The polymeride removal is preferably applied to the diluted and hydrolyzed olefine-sulfuric acid absorption product due to the presence of dialkyl sulfates which are present in non-hydrolyzed mixtures and which are removed, in part, with the polymers and in part hydrolyzed to alcohol.

The raffinate of the hydrolytic mixture is subjected to distillation in order to separate the acid, in this case sulfuric acid, present. A distillate is thereby obtained consisting of a mixture that is mainly governed by the composition of the binary azeotrope: alcohol-water. After a suitable quantity of entraining liquid, which is the same as the extraction agent used for the polymeride removal, has been added, this mixture is subjected to an azeotropic distillation for the purpose of obtaining water-free alcohol. This last treatment is carried out in the known manner in continuously or intermittently working distilling-rectifying columns.

In some cases, alcohol losses occur during the single extraction of the hydrolytic mixture in consequence of alcohol being absorbed by the extraction agent. When, however, the extraction is carried out according to the process whereby a liquid mixture is split up into its components or groups of components by subjecting the mixture to the countercurrent action of two liquids and soluble only to a slight extent one in the other, and thereby using water, diluted acid as sulfuric acid and the like as second extraction agent, a more complete separation is obtainable than is generally possible when only one extraction agent is used; for example, as described in British Patent No. 355,294.

The process, according to the invention, is explained by means of the following example: 75.6 kilos propylene is absorbed at temperatures between 0° and 10° C. in about 96% sulfuric acid, whereby 1.8 molecules propylene per mol. sulfuric acid is absorbed. The acid mixture obtained is then diluted with 200 kilos water and subjected to hydrolysis. The composition of the hydrolytic mixture is:

| | Per cent by weight |
|---|---|
| Alcohol | 27.1 |
| Water | 45.8 |
| $H_2SO_4$ | 25.9 |
| Polymerides | 1.2 |

In an apparatus for continuous extraction with two auxiliary liquids, this mixture is washed with a countercurrent stream of water and benzol, which is used in quantities of about 13.25 kilos benzol per 100 kilos hydrolytic mixture. A polymeride-containing extract and a practically polymeride-free mixture of alcohol, water and sulfuric acid are obtained, which mixture contains a trace of benzol. The composition of the extract is as follows:

| | Per cent by weight |
|---|---|
| Benzol | 88.6 |
| Polymerides | 7.7 |
| Alcohol | 2.8 |
| Water | 0.9 | whilst that of the raffinate is:

| | Per cent by weight |
|---|---|
| Alcohol | 21.6 |
| Water | 56.7 |
| Sulfuric acid | 21.2 |
| Benzol-polymeride | 0.5 |

(of this mixture, less than 0.05% by weight is polymeride)

The raffinate is subjected to a distillation, whereby it is taken into consideration that the quantities of water used for the extraction are fixed, preferably, with the object of obtaining about 80% alcohol and also an acid of about 30%.

The distillate has the following composition:

| | Per cent by weight |
|---|---|
| Alcohol | 79.0 |
| Water | 19.4 |
| Benzol-polymeride | 1.4 |

(of this mixture, less than 0.05% by weight is polymeride)

The residue, consisting of diluted sulfuric acid, has a $$\text{s. g. } d\frac{15}{15} \text{ of } 1.2085$$

and contains, therefore, about 28.2% sulfuric acid.

The distillate can be further worked up to water-free alcohol in the known manner, according to the azeotropic process, with the use of benzol as entraining liquid.

We claim as our invention:

1. A process for the manufacture of alcohols, comprising: subjecting an aqueous solution of an olefine-mineral acid absorption product to treatment with a relatively low-boiling organic extraction agent for polymerides which may be present which extraction agent is substantially immiscible with water and the liquid to be extracted and is substantially miscible with the polymerides, said extraction agent being capable of removing water from aqueous solutions of alcohol by azeotropic distillation, separating the extract from the raffinate, subjecting the raffinate to distillation whereby an aqueous alcoholic distillate is obtained and subjecting said distillate to azeotropic distillation in the presence of the extraction agent which functions as an auxiliary agent whereby substantially water-free, polymeride-free alcohol is obtained.

2. A process for the manufacture of alcohols, comprising: subjecting an aqueous solution of an olefine-polybasic mineral acid absorption product to treatment with a relatively low-boiling organic extraction agent for polymerides which may be present, which extraction agent is substantially immiscible with water and the liquid to be extracted and is substantially miscible with the polymerides, said extraction agent being capable of removing water from aqueous solutions of alcohol by azeotropic distillation, separating the extract from the raffinate, subjecting the raffinate to distillation whereby an aqueous alcoholic distillate is obtained and subjecting said distillate to azeotropic distillation in the presence of the extraction agent which functions as an auxiliary agent whereby substantially water-free, polymeride-free alcohol is obtained.

3. A process for the manufacture of alcohols, comprising: subjecting an aqueous solution of an olefine-mineral acid absorption product to a hydrolytic treatment, contacting said hydrolytic mixture with a relatively low-boiling organic extraction agent for polymerides which may be present which extraction agent is substantially immiscible with water and the liquid to be extracted and is substantially miscible with the polymerides, said extraction agent being capable of removing water from aqueous solutions of alcohol by azeotropic distillation, separating the extract from the raffinate, subjecting the raffinate to distillation whereby an aqueous alcoholic distillate is obtained and subjecting said distillate to azeotropic distillation in the presence of the extraction agent which functions as an auxiliary agent whereby substantially water-free, polymeride-free alcohol is obtained.

4. A process for the manufacture of alcohols, comprising: at least partially hydrolyzing an aqueous solution of an olefine-mineral acid absorption product, contacting said hydrolytic mixture with a relatively low-boiling organic extraction agent for polymerides which extraction agent is substantially immiscible with water and the liquid to be extracted and is substantially miscible with the polymerides, said extraction agent being capable of removing water from aqueous solutions of alcohol by azeotropic distillation, separating the extract from the raffinate, subjecting the raffinate to distillation whereby an aqueous alcoholic distillate is obtained and subjecting said distillate to azeotropic distillation in the presence of the extraction agent which functions as an auxiliary agent whereby substantially water-free, polymeride-free alcohol is obtained.

5. A process for the manufacture of alcohols, comprising: at least partially hydrolyzing an aqueous solution of an olefine-sulfuric acid absorption product, contacting said hydrolytic mixture with a relatively low-boiling organic extraction agent for polymerides which extraction agent is substantially immiscible with water and the liquid to be extracted and is substantially miscible with the polymerides, said extraction agent being capable of removing water from aqueous solutions of alcohol by azeotropic distillation, separating the extract from the raffinate, subjecting the raffinate to distillation whereby an aqueous alcoholic distillate is obtained and subjecting said distillate to azeotropic distillation in the presence of the extraction agent which functions as an auxiliary agent whereby substantially water-free, polymeride-free alcohol is obtained.

6. A process for the manufacture of alcohols, comprising: at least partially hydrolyzing an aqueous solution of an olefine-sulfuric acid absorption product in the presence of a regulated quantity of water, contacting said hydrolytic mixture with a relatively low-boiling organic extraction agent for polymerides which extraction agent is substantially immiscible with water and the liquid to be extracted and is substantially miscible with the polymerides, said extraction agent being capable of removing water from aqueous solutions of alcohol by azeotropic distillation, separating the extract from the raffinate, subjecting the raffinate to distillation whereby an aqueous alcoholic distillate is obtained and subjecting said distillate to azeotropic distillation in the presence of the extraction agent which functions as an auxiliary agent, the undistilled raffinate possessing the greatest possible concentration of waste sulfuric acid.

7. A process for the manufacture of alcohols which comprises, subjecting an aqueous solution of an olefin-sulfuric acid absorption product to treatment with a relatively low-boiling organic extraction agent for polymerides which may be present, which extraction agent is substantially immiscible with the water and the liquid to be extracted and is substantially miscible with the polymerides, said extraction agent being capable of removing water from aqueous solutions of alcohol by azeotropic distillation, separating the extract from the raffinate, distilling the raffinate whereby an aqueous alcoholic distillate is obtained and condensed and subjecting said condensate to azeotropic distillation in the presence of the extraction agent which functions as an auxiliary agent whereby substantially water-free, polymeride-free alcohol is obtained.

8. A process for the manufacture of alcohols which comprises, subjecting an aqueous solution of an olefine-mineral acid absorption product to treatment with a relatively low-boiling organic extraction agent for polymerides which may be present, which extraction agent is substantially immiscible with water and the liquid to be extracted and is substantially miscible with the polymerides, said extraction agent being capable of removing water from aqueous solutions of alcohol by azeotropic distillation, separating the extract from the raffinate and subjecting the raffinate to distillation whereby an alcoholic distillate is obtained.

9. A process for the manufacture of alcohols which comprises, subjecting an aqueous solution of an olefine-mineral acid absorption product to a hydrolytic treatment, contacting said hydrolytic mixture with a relatively low-boiling organic extraction agent for polymerides which may be present, which extraction agent is substantially immiscible with water and the liquid to be extracted and is substantially miscible with the polymerides, said extraction agent being capable of removing water from aqueous solutions of alcohol by azeotropic distillation, separating the extract from the raffinate and subjecting the raffinate to distillation whereby an alcoholic distillate is obtained.

10. A process for the manufacture of alcohols which comprises, at least partially hydrolyzing an aqueous solution of an olefine-sulfuric acid absorption product, contacting said hydrolytic mixture with a relatively low-boiling organic extraction agent for polymerides which may be present, which extraction agent is substantially immiscible with water and the liquid to be extracted and is substantially miscible with the polymerides, said extraction agent being capable of removing water from aqueous solutions of alcohol by azeotropic distillation, separating the extract from the raffinate and subjecting the raffinate to distillation whereby an alcoholic distillate is obtained.

11. A process for the manufacture of alcohols which comprises, subjecting an aqueous solution of an olefine-sulfuric acid absorption product to treatment with a relatively low-boiling organic extraction agent for polymerides which may be present, which extraction agent is substantially immiscible with water and the liquid to be extracted and is substantially miscible with the polymerides, said extraction agent being capable of removing water from aqueous solutions of alcohol by azeotropic distillation, employing in countercurrent a second extraction agent which is substantially immiscible with the first extraction agent and is substantially miscible with alcohol to recover absorbed alcohol, and recovering polymeride-free alcohol from the mixture of alcohol, water and second extraction agent.

12. A process for the manufacture of alcohols which comprises, subjecting an aqueous solution of an olefine-sulfuric acid absorption product to treatment with a relatively low-boiling organic extraction agent for polymerides which may be present, which extraction agent is substantially immiscible with water and the liquid to be extracted and is substantially miscible with the polymerides, said extraction agent being capable of removing water from aqueous solutions of alcohol by azeotropic distillation, employing in countercurrent a second extraction agent of the class consisting of water and dilute sulfuric acid to recover absorbed alcohol, and recovering polymeride-free alcohol from the mixture of alcohol, water and second extracting agent.

13. In a process for the manufacture of alcohol wherein an aqueous solution of an olefine-mineral acid absorption product has been treated with a relatively low-boiling organic extraction agent for polymerides, which extraction agent is substantially immiscible with water and the liquid to be extracted and is substantially miscible with polymerides, said extraction agent being capable of removing water from aqueous solutions of alcohol by azeotropic distillation, the step of employing in countercurrent a second extraction agent which is substantially immiscible with the first extraction agent and is substantially miscible with alcohol and subsequently recovering a substantial quantity of alcohol from the second extraction agent.

14. In a process for the manufacture of alcohols wherein an aqueous solution of an olefine-mineral acid absorption product has been treated with a relatively low-boiling organic extraction agent for polymerides, which extraction agent is substantially immiscible with water and the liquid to be extracted and is substantially miscible with polymerides, said extraction agent being capable of removing water from aqueous solutions of alcohol by azeotropic distillation, the step of employing in countercurrent a second extraction agent of the class consisting of water and dilute mineral acids and subsequently recovering a substantial quantity of alcohol from the second extraction agent.

ADRIANUS JOHANNES van PESKI.
WILHELM CAREL BREZESINSKA SMITHUYSEN.